UNITED STATES PATENT OFFICE.

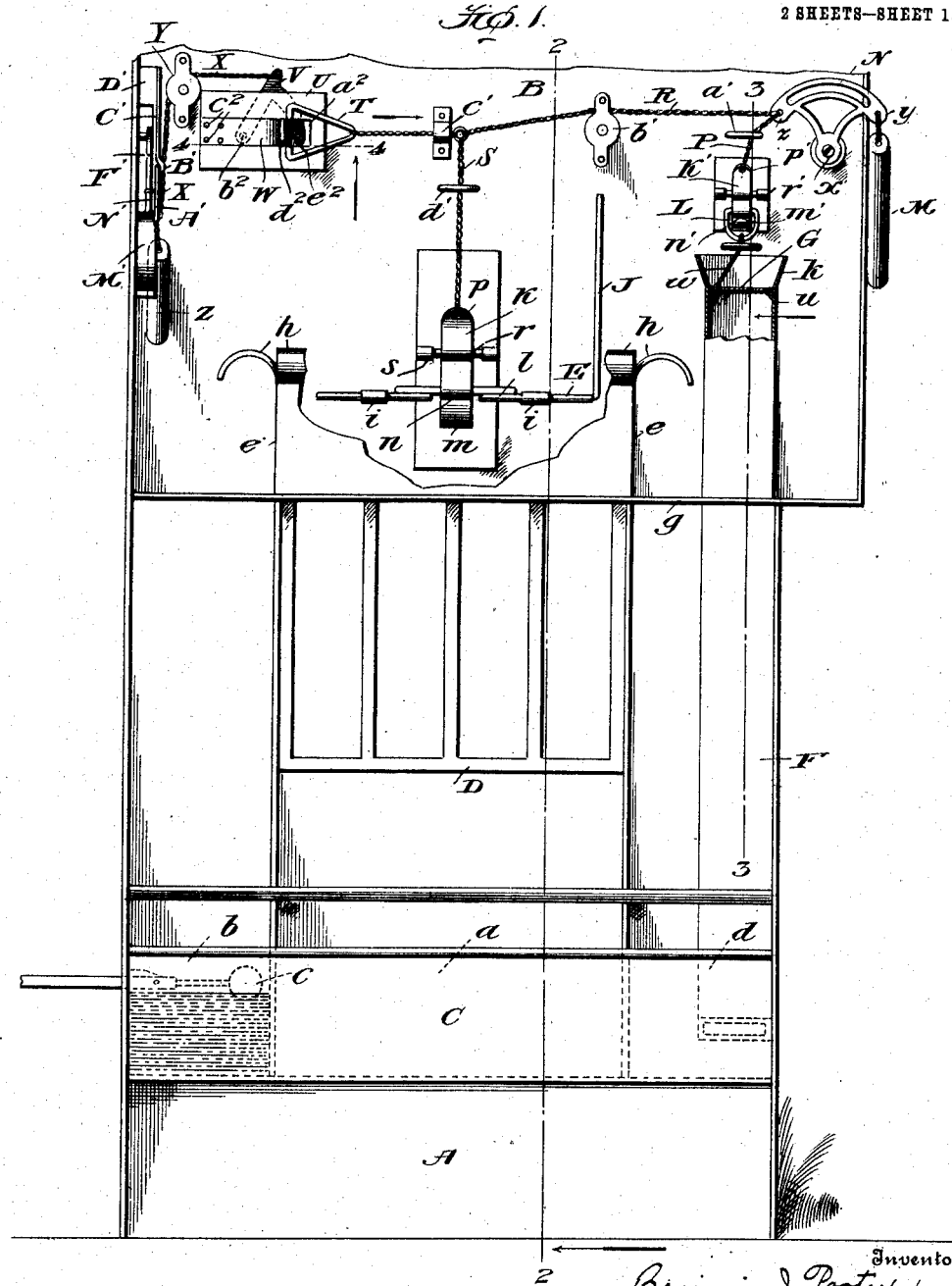

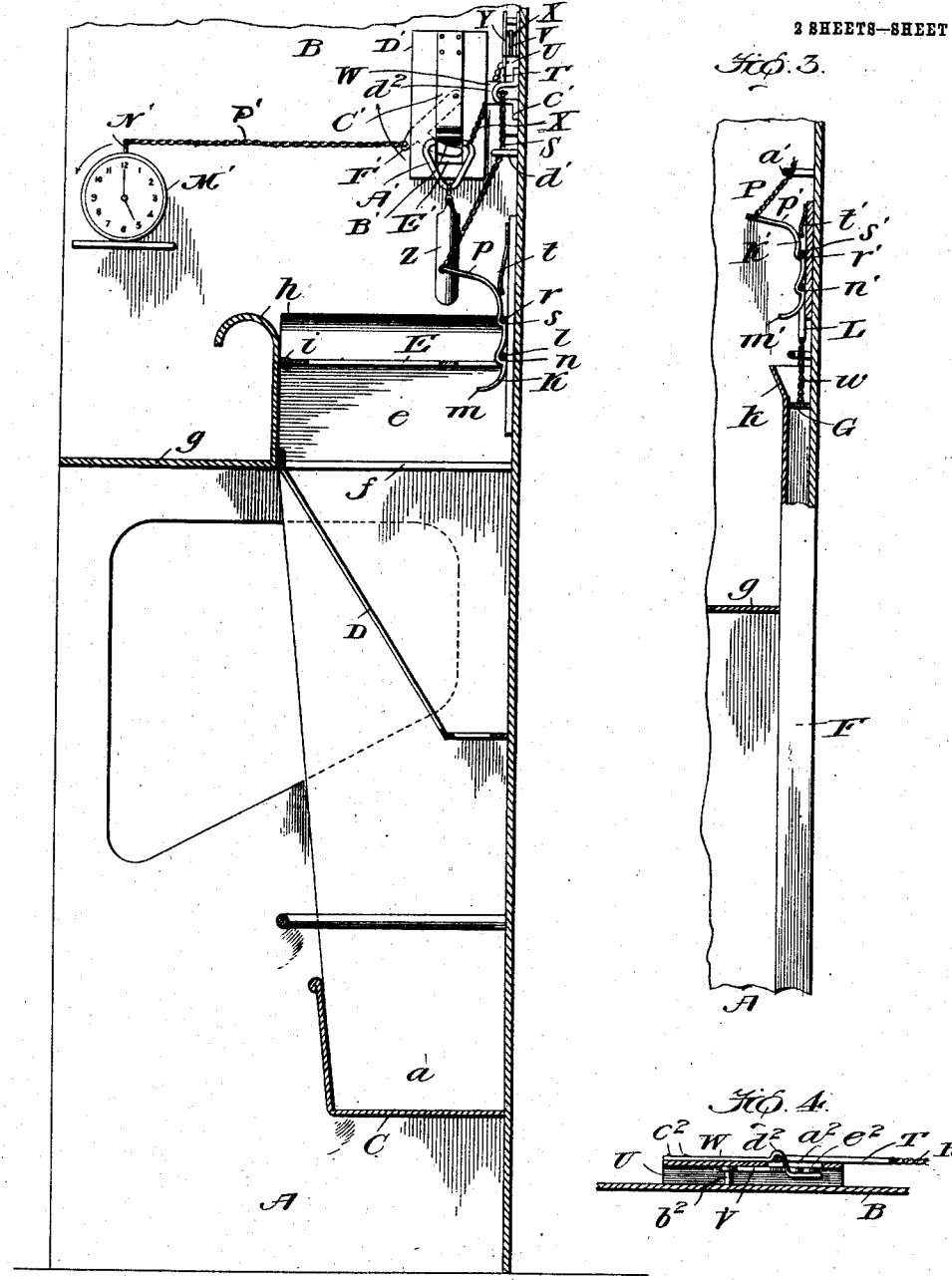

BENJAMIN J. PORTER AND HARRY BINNINGTON, OF SALT LAKE CITY, UTAH.

STOCK-FEEDING APPARATUS.

No. 907,283.   Specification of Letters Patent.   Patented Dec. 22, 1908.

Application filed July 15, 1908. Serial No. 443,702.

*To all whom it may concern:*

Be it known that we, BENJAMIN J. PORTER and HARRY BINNINGTON, citizens of the United States, residing at Salt Lake City, in the county of Salt Lake and State of Utah, have invented new and useful Improvements in Stock-Feeding Apparatus, of which the following is a specification.

Our invention pertains to apparatus for facilitating the feeding of cattle, horses, and other stock; and it consists in the peculiar and advantageous apparatus hereinafter described and particularly pointed out in the claims appended.

In the drawings, accompanying and forming part of this specification: Figure 1 is a view illustrating a stall and a portion of a loft above the stall, and also illustrating our novel apparatus as properly arranged relative to the stall and loft. Fig. 2 is a section taken in the plane indicated by the line 2—2 of Fig. 1, looking in the direction indicated by arrow. Fig. 3 is a detail view taken in the plane indicated by the line 3—3 of Fig. 1. Fig. 4 is a detail section taken on the line 4—4 of Fig. 1, looking in the direction indicated by the arrow.

Similar letters designate corresponding parts in all of the views of the drawings, referring to which:

A is a stall, and B, a portion of a loft above the stall. The stall is provided at its forward end with a trough C, and we prefer that the said trough comprise a central compartment $a$, an end compartment $b$ designed to contain water and equipped with a conventional or any other suitable float valve $c$, and an end compartment $d$ designed to receive oats and analogous feed. Above the central portion of the trough C we arrange a hay rack D which is preferably disposed between two partition walls $e$ and communicates with an opening $f$ in the floor $g$ of the loft B. The said opening $f$ is surrounded by a guard wall or flange $h$, and in the same is arranged a gravitating platform E pivoted at $i$ and provided with a handle J and designed when in its horizontal position to support a feed of hay. Extending from a point above the floor $g$ of the loft B down through the said floor and into the feed compartment $d$ of the trough C, is a feed conduit or chute F, the upper end of which is preferably, though not necessarily, flared, as indicated by $k$, and in the said conduit F, at a suitable distance below its upper end, is arranged a vertically swinging platform G, which in its horizontal position is adapted to support a feed of oats or the like.

As best shown in Fig. 2, the swinging end of the gravitating platform E is provided with a bar $l$, disposed parallel to the center of movement of the platform, and the said bar $l$ is designed to be engaged by a peculiar latch lever K, the office of which is to normally retain the platform E in a horizontal position. The said latch lever K is provided with a lower inclined end portion $m$, a transverse groove or channel $n$ disposed immediately above said end portion $m$, and an arm $p$ disposed above and overhanging the platform E. Said latch lever K is fulcrumed at $r$ on a suitable fixed support $s$, and its said arm $p$ is backed by a spring strip $t$, whereby it will be manifest that the latch lever will normally rest in the position shown in Fig. 2 and hence normally hold the platform E in its horizontal position, after the manner illustrated in said figure. It will also be manifest that when the latch lever K is rocked against the action of the spring strip $t$, the groove or channel $n$ of the latch lever will be disengaged from the bar $l$ of the platform E to permit said platform to swing downward and to precipitate the feed of hay on said platform into the rack D where it can be conveniently reached by the animal occupying the stall. It will further be manifest that when an attendant grasps the hand lever J and through the same raises the platform E to its horizontal position, the bar $l$ of the said platform will ride past the inclined end $m$ of the latch lever K and be seated and secured in the groove or channel $n$ of said latch lever.

The platform G in the conduit F is hinged at $u$, and is connected through a cable section $w$ with a ring L. This latter is designed to be placed in engagement with a latch lever K' which is similar to the latch lever K in that it is fulcrumed at $r'$, is provided with a lower inclined end $m'$, and a groove or channel $n'$ immediately above said inclined end $m'$, and is further provided with an arm $p'$ which overhangs the platform G. The latch lever K' is also backed by a spring strip $t'$ similar to the before described strip $t$, and from this it follows that when the ring L is engaged with the groove or channel $n'$, the latch lever K' will operate to retain the platform G in a horizontal position. When, however, the latch lever K' is rocked against the action of the spring strip t', it will be observed that the ring L is released from the latch lever and is free to fall with the platform G and the feed of oats or the like on the latter. At this point it will be noted that the latch lever K' is fulcrumed at r', in the manner described, on a fixed support s'; also, that the portions of the levers K and K' below the grooves or seats of said levers rest normally against the faces of the supports to which the levers are connected, this being advantageous since it enables each lever to better hold the part with which it coöperates.

M is a weight.

N is a vertically swinging lever, fulcrumed at x and having an arm y connected with the weight M.

P is a cable connected to the other arm z of the lever N and extending through a guide a', and connected with the arm p' of the latch lever K', and R is a cable which is also connected to the lever arm z and is passed through a guide b' and a guide c' and is provided with a branch cable S, which latter is carried through a guide d', and is connected to the arm p of the latch lever K.

At this point we desire it understood that a number of stalls may be equipped with the mechanism described, and that a cable R may be connected with the mechanisms of the several stalls, but this we have deemed it unnecessary to illustrate. We also desire it understood that any suitable means may be employed for detachably securing the cable R against movement in the direction indicated by arrow in Fig. 1, without involving departure from the scope of our claimed invention.

It will be underatood from the foregoing that when the cable R is released and permitted to move in the direction of the arrow in Fig. 1, the gravitation of the weight M will operate through the lever N, the cable P and the cables R and S to disengage the latch levers from the platforms E and G, and permit the latter to swing downward.

T is a loop which we prefer to provide at the end of the cable R.

U is a suitably supported, fixed frame having an opening $a^2$ in its front wall.

V is a latch pivoted at $b^2$ and movable back of the front wall of the frame U, and W is a tongue connected at $c^2$ to the frame U and having a groove or channel $d^2$ and also having an end portion $e^2$ extending forward of the groove or channel $d^2$.

As shown in Fig. 1 it will be seen that when the loop T is arranged in the groove or channel $d^2$ of the tongue W, and the latch V is arranged in front of the end portion $e^2$ of said tongue W, there is no liability of the loop T being casually released from the tongue W. When, however, the latch V is swung toward the left, (see Fig. 1,) the tongue W will be rendered free to swing forward and the loop T will be released therefrom and permitted to move toward the right under the pull of the weight M.

A cable X is connected to the upper portion of the latch V, and is carried over a sheave Y, and then downward, and is provided with a weight Z and with a ring or loop A', the said loop being located above the weight. The loop A' is designed to be arranged in the groove or channel B' of a tongue C', which is connected at its upper end to a fixed frame D' having in its front wall an opening E', designed for the inward and outward movement of the lower end of the tongue C'. A latch F' is pivoted in the frame D' back of the front wall thereof and is designed in the position shown best in Fig. 2 to hold the tongue C' or rather the groove or channel B' thereof in engagement with the loop A'. When, however, the said latch F' is pulled in the direction indicated by the arrow in Fig. 2, it will be manifest that the tongue C' will be released from the said latch, and the loop A' will be released from the tongue C'. When this operation takes place the weight Z will fall and by so doing will, through the cable X, effect the disengagement of the latch from the tongue W, whereupon the loop T of the cable R will be released, and the weight M will be permitted to gravitate in the manner and for the purpose before set forth.

Any suitable means may be utilized to pull the latch F' in the direction indicated by arrow in Fig. 2, but when it is desired to release the platform E and the platform G automatically and at a predetermined time, we provide a conventional alarm clock M' having upon its alarm spindle an arm N' which is connected through a cable P' with the latch F'. Thus when the predetermined hour arrives and the arm N' is moved by the clock mechanism in the direction indicated by arrow in Fig. 2, the latch F' will be disengaged from the tongue C'.

The general operation of our novel apparatus will be fully understood from the foregoing, and it is therefore deemed unnecessary to again described the same; and it will also be understood from the foregoing that subsequent to an operation of the apparatus, the apparatus may be expeditiously and easily set or arranged for another operation.

Having described our invention, what we claim and desire to secure by Letters-Patent, is:

1. In a stock feeding apparatus, the combination with a vertically swinging platform, and a bar connected and movable with said platform, of a latch lever fulcrumed at an intermediate point of its length above the platform and on a fixed support, and having a groove or channel in its lower arm designed to receive the said bar and an inclined end portion below said groove or channel and also having an upper arm which overhangs the platform, a spring interposed between the fixed support and the said upper arm of the latch lever, a vertically swinging lever, a weight connected with one arm thereof, a connection intermediate the other arm of said lever and the upper arm of the latch lever, and means for normally holding the vertically swinging lever against movement by the weight.

2. In a stock feeding apparatus, the combination of a feed trough, a hay rack disposed above the central portion of the trough, a conduit or chute arranged vertically at one side of the hay rack, a vertically swinging platform arranged in an opening or passage above the hay rack, and having a bar at its free end, a vertically swinging platform arranged in the said conduit and having connected therewith a loop provided with a bar, a latch lever fulcrumed at an intermediate point of its length above the first named platform and on a fixed support and having a groove or channel in its lower arm designed to receive the bar of said platform and an inclined end portion below said groove or channel and also having an upper arm which overhangs the platform, a spring interposed between the fixed support and the said upper arm of the latch lever, a latch lever fulcrumed at an intermediate point of its length above the second named platform and on a fixed support and having a groove or channel in its lower arm designed to receive the bar of the loop connected with said platform and an inclined end portion below said groove or channel and also having an upper arm which overhangs the platform, a spring interposed between the fixed support and the said upper arm of said latch lever, a vertically swinging lever, a weight connected with one arm thereof, connections intermediate the other arm of said lever and the upper arms of the latch levers, and means for normally holding the vertically swinging lever against movement by the weight; said means comprising a loop connected with the said intermediate connections, a fixed frame having an opening in its front wall, a tongue pivoted to the fixed frame and having a groove or channel to receive a bar of said loop and also having an end portion movable through the opening in the front wall of the fixed frame, and a latch pivoted to the fixed frame back of the front wall thereof and adapted in one position to engage said end of the tongue, and means for moving the said latch to disengage the same from the tongue.

3. The combination in a stock feeding apparatus, of a movable loop having a bar, a fixed frame having an opening in its front wall, a tongue pivoted to said frame and having a groove or channel to receive the bar of the loop and also having an end portion movable through the opening in the front wall of the fixed frame, a latch pivoted in the fixed frame, back of the front wall thereof, and adapted to engage the said end portion of the tongue, and means connected with the said latch for moving the same out of engagement with the tongue.

In testimony whereof we have hereunto set our hands in presence of two subscribing witnesses.

BENJAMIN J. PORTER.
HARRY BINNINGTON.

Witnesses:
  CHAS. B. MCELROY,
  C. W. BUNTING.